United States Patent
Kim et al.

(10) Patent No.: US 9,262,521 B2
(45) Date of Patent: Feb. 16, 2016

(54) APPARATUS AND METHOD FOR EXTRACTING HIGHLIGHT SECTION OF MUSIC

(71) Applicant: Electronics and Telecommunications Research Institute, Daejeon (KR)

(72) Inventors: Sung-Min Kim, Daejeon (KR); Seung-Jae Lee, Daejeon (KR); Jung-Hyun Kim, Daejeon (KR); Young-Ho Suh, Daejeon (KR); Yong-Seok Seo, Daejeon (KR); Jee-Hyun Park, Daejeon (KR); Sang-Kwang Lee, Daejeon (KR); Jung-Ho Lee, Wonju (KR); Young-Suk Yoon, Daejeon (KR); Won-Young Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 396 days.

(21) Appl. No.: 13/685,632

(22) Filed: Nov. 26, 2012

(65) Prior Publication Data

US 2013/0138232 A1 May 30, 2013

(30) Foreign Application Priority Data

Nov. 28, 2011 (KR) .......................... 10-2011-0124950

(51) Int. Cl.
*G06F 17/00* (2006.01)
*G06F 17/30* (2006.01)
(Continued)

(52) U.S. Cl.
CPC ...... *G06F 17/3074* (2013.01); *G06F 17/30775* (2013.01); *G10H 1/0008* (2013.01); *G10L 25/54* (2013.01); *G10L 25/87* (2013.01); *G11B 27/28* (2013.01); *G10H 2210/061* (2013.01); *G10H 2240/081* (2013.01); *G10L 25/21* (2013.01); *H04N 21/4384* (2013.01); *H04N 21/4394* (2013.01)

(58) Field of Classification Search
CPC ..................... H04N 21/4394; G06F 17/30787; G10H 2210/046; G10H 2240/081; G10H 2240/131
See application file for complete search history.

(56) References Cited

U.S. PATENT DOCUMENTS 5,918,223 A * 6/1999 Blum et al.
2003/0112265 A1 * 6/2003 Zhang ........................... 345/723

(Continued)

FOREIGN PATENT DOCUMENTS

| KR | 1020050015165 A | 2/2005 |
| KR | 1020070043113 A | 4/2007 |
| KR | 1020090019582 A | 2/2009 |

*Primary Examiner* — Curtis Kuntz
*Assistant Examiner* — Thomas Maung (57) ABSTRACT

Disclosed are an apparatus and a method for extracting a highlight section of music. The apparatus for extracting a highlight section of music in accordance with the embodiment of the present invention includes a frame divider that divides an audio file into a plurality of frames having a predetermined sample length; an average energy signal calculator that calculates a signal representing the average magnitude of audio energy for a plurality of samples belonging to each frame for each frame of the plurality of frames; and a highlight section selector that extracts a low frequency signal from the signal representing the average audio energy magnitude for each frame and determines the highlight section from frame sections including maximum points of the low frequency signal.

8 Claims, 8 Drawing Sheets

(51) Int. Cl.
*G11B 27/28* (2006.01)
*G10L 25/87* (2013.01)
*G10L 25/54* (2013.01)
*G10H 1/00* (2006.01)
*H04N 21/438* (2011.01)
*H04N 21/439* (2011.01)
*G10L 25/21* (2013.01)

(56) References Cited

U.S. PATENT DOCUMENTS

2005/0016360 A1* 1/2005 Zhang ............................ 84/600
2008/0292273 A1* 11/2008 Wang et al. .................... 386/96

* cited by examiner

APPARATUS AND METHOD FOR EXTRACTING HIGHLIGHT SECTION OF MUSIC

CROSS-REFERENCE TO RELATED APPLICATION

This application claims priority to Korean Patent Application No. 10-2011-0124950, filed on Nov. 28, 2011, which is incorporated herein by reference in its entirety.

BACKGROUND OF THE INVENTION

1. Field of the Invention

Exemplary embodiments of the present invention relate to an apparatus and a method for extracting a highlight section of music, and more particularly, to an apparatus and a method for extracting a highlight section of music capable of allowing listeners to rapidly check their preferred music, and even to easily check whether music about which there is no information suits their tastes.

2. Description of Related Art

Recently, with the rapid development of digital audio systems, people can listen to music anywhere and at any time. There are various types of music in various nations and epochs, and music has been used to realize various social goals such as entertainment, recreation, ceremony, information delivery, and the like. The amount of music that people can listen to nowadays is vast. Unlike in the past, because the public may own various and abundant music and easily access the music, searching for their preferred music or checking a specific portion of music demands professional capability or a considerable amount of physical time.

Recently, sound source providing service providers provide meta information (composers, singers, genres, tempos, release year, and the like) about various kinds of music so as to allow users to more rapidly check musical information. Meanwhile, Korean Patent No. 10-0597969, and the like, discloses a technology of providing a pre-listen service for a predetermined time from the start of music followed by the storage of audio files streamed online, in order to enable users to choose and store only the preferred music.

However, the meta information about music cannot convey the feeling of music to listeners, and the provision of the pre-listen service for a predetermined time from the start of music as described in Korean Patent No. 10-0597969, and the like, cannot convey the feeling of music when it reaches its climax.

In addition, some sound source providing service providers extract highlight sections that represent music so as to improve the convenience of music searching and provide the extracted highlight sections to the users, in which case the music providing speed may be slow, and moreover, the accuracy of the highlight sections may be low.

Therefore, a need exists for a method for allowing listeners to rapidly check the highlight sections of their preferred music and extracting highlights that are satisfactory as highlight sections for checking purposes.

SUMMARY OF THE INVENTION

An embodiment of the present invention is directed to provide a technology for extracting a highlight section of music so as to enable listeners to rapidly check for preferred music and even to easily check whether music about which there is no information suits their tastes.

Disclosed is an apparatus for extracting a highlight section of music so as to play the highlight section by analyzing an input audio file, including: a frame divider that divides the input audio file into a plurality of frames having a predetermined sample length; an average energy signal calculator that calculates a signal representing the average magnitude of audio energy for a plurality of samples belonging to each frame for each frame of the plurality of frames; and a highlight section selector that extracts a low frequency signal from the signal representing the average audio energy magnitude for each frame and determines the highlight section from frame sections that include the maximum points of the low frequency signal.

The highlight section selector may include a primary highlight candidate group selector that selects the frame sections that include the maximum points of the low frequency signals as primary highlight section candidate groups.

The highlight section selector may further include a secondary highlight candidate group selector that selects secondary highlight section candidate groups from the primary highlight candidate group by determining whether the input audio file is an audio file containing an instrumental.

The secondary highlight candidate group selector may select all frame sections belonging to the primary highlight section candidate groups as the secondary highlight section candidate groups if it is determined that the input audio file is the audio file containing the instrumental, and may select frame sections that include voice signals from among the frame sections belonging to the primary highlight section candidate groups as the secondary highlight section candidate groups if it is determined that the input audio file is not the audio file containing the instrumental.

The highlight section selector may further include a tertiary highlight candidate group selector that analyzes the average magnitude of audio energy for each frame for adjacent frame sections of a start point of a first frame of the frame sections belonging to the primary highlight section candidate groups and selects as tertiary highlight section candidate groups the frame sections in which the average magnitude of audio energy changes the most in the frame sections adjacent to the start point of the first frame of the frame sections belonging to the primary highlight section candidate groups.

The highlight section selector may further include a highlight section determiner that determines that a first frame section of frame sections belonging to the tertiary highlight section candidate groups is a final highlight section if it is determined that the frame sections of the tertiary highlight section candidate groups corresponding to frame sections of the secondary highlight section candidate groups are not present when comparing the secondary highlight section candidate groups with the tertiary highlight section candidate groups.

The highlight section determiner may determine that a frame section belonging to the frame sections of the tertiary highlight section candidate groups corresponding to the frame sections of the secondary highlight section candidate groups is the final highlight section if it is determined that frame sections of the tertiary highlight section candidate groups corresponding to the frame sections of the secondary highlight section candidate groups are present by comparing the secondary highlight section candidate groups with the tertiary highlight section candidate groups.

The highlight section determiner may align the tertiary highlight section candidate groups in an order such that an inter-frame distance from the frame sections belonging to the primary highlight section candidate groups is short, and may determine that the final highlight section is the frame sections in which the inter-frame distance from the frame sections belonging to the primary highlight section candidate groups among the frame sections of the tertiary highlight section candidate groups corresponding to the frame sections of the secondary highlight section candidate groups is the shortest when the frame sections of the tertiary highlight section candidate groups corresponding to the frame sections of the secondary highlight section candidate groups are present.

The technology for extracting the highlight section of music may further include: a start point searcher that searches for a start point of the highlight section from the input audio file by using a position of a first frame of the highlight section determined by the highlight section selector and sample lengths of each frame.

A method for extracting a highlight section of music so as to play the highlight section by analyzing an input audio file includes: dividing the input audio file into a plurality of frames having a predetermined sample length using a frame divider; calculating a signal representing the average magnitude of audio energy for a plurality of samples belonging to each frame for each frame of the plurality of frames, using an average energy signal calculator; and extracting a low frequency signal from the signal representing the average magnitude of audio energy for each frame and determining the highlight section from frame sections that include the maximum points of the low frequency signal, using a highlight determiner.

The determination of the highlight section from the frame sections that include the maximum points of the low frequency signals may include selecting the frame sections that include the maximum points of the low frequency signals as primary highlight section candidate groups.

The determination of the highlight section from the frame sections that include the maximum points of the low frequency signals may further include selecting secondary highlight section candidate groups from the primary highlight candidate group selector by determining whether the input audio file is an audio file containing an instrumental.

At the selecting of the secondary highlight section candidate groups, all frame sections belonging to the primary highlight section candidate groups may be selected as the secondary highlight section candidate groups if it is determined that the input audio file is the audio file containing the instrumental, and frame sections that include voice signals among the frame sections belonging to the primary highlight section candidate groups may be selected as the secondary highlight section candidate groups if it is determined that the input audio file is not the audio file containing the instrumental.

The determination of the highlight section from the frame sections that include the maximum points of the low frequency signals may further include: analyzing the average magnitude of audio energy for each frame for adjacent frame sections of a start point of a first frame of the frame sections belonging to the primary highlight section candidate groups, and selecting as tertiary highlight section candidate groups the frame sections in which the average magnitude of audio energy changes the most in the frame sections adjacent to the start point of the first frame of the frame sections belonging to the primary highlight section candidate groups.

The determining of the highlight section from the frame sections that include the maximum points of the low frequency signals may further include: comparing the secondary highlight section candidate groups with the tertiary highlight section candidate groups; and determining that a first frame section among frame sections belonging to the tertiary highlight section candidate groups is a final highlight section if it is determined that the frame sections of the tertiary highlight section candidate groups corresponding to frame sections of the secondary highlight section candidate groups are not present.

The determination of the highlight section from the frame sections that include the maximum points of the low frequency signals may further include: determining that a frame section belonging to the frame sections of the tertiary highlight section candidate groups corresponding to the frame sections of the secondary highlight section candidate groups is a final highlight section when the frame sections of the tertiary highlight section candidate groups corresponding to the frame sections of the secondary highlight section candidate groups is present.

The determination as the final highlight section may include: aligning the tertiary highlight section candidate groups in an order such that the inter-frame distance from the frame sections belonging to the primary highlight section candidate groups is short, and determining that the final highlight section is the frame sections in which the inter-frame distance from the frame sections belonging to the primary highlight section candidate groups among the frame sections of the tertiary highlight section candidate groups corresponding to the frame sections of the secondary highlight section candidate groups is the shortest when the frame sections of the tertiary highlight section candidate groups corresponding to the frame sections of the secondary highlight section candidate groups are present.

The method for extracting the highlight section of music may further include: searching for a start point of the highlight section from the input audio file by using a position of a first frame of the highlight section and the sample lengths of each frame.

DESCRIPTION OF SPECIFIC EMBODIMENTS

Exemplary embodiments of the present invention will be described below in greater detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, the configuration and operation of the apparatus for extracting the highlight section of music in accordance with an embodiment of the present invention will be described.

Figure 1:
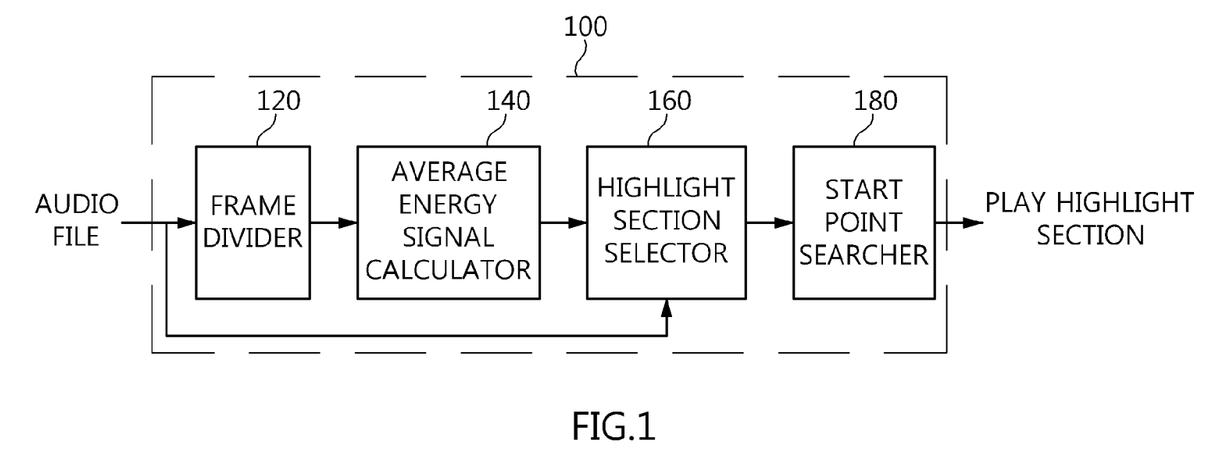
FIG. 1 is a block diagram schematically illustrating the configuration of an apparatus for extracting a highlight section of music in accordance with an embodiment of the present invention.

FIG. 1 is a block diagram schematically illustrating the configuration of an apparatus for extracting a highlight section of music in accordance with an embodiment of the present invention.

Referring to FIG. 1, an apparatus 100 for extracting a highlight section of music in accordance with the embodiment of the present invention selects frame sections corresponding to the highlight sections from audio files by receiving the audio files from outside, and searches and outputs information about the position of the first frame of the corresponding frame section, thereby playing the highlight section.

Here, the apparatus 100 for extracting the highlight section of music in accordance with the embodiment of the present invention includes a frame divider 120, an average energy signal calculator 140, a highlight section selector 160, and a start point searcher 180.

First, the frame divider 120 divides audio files input from the outside into a plurality of frames having a predetermined sample length (number of samples). For example, when the playing time corresponds to 3 minutes (180 seconds) and an audio file having a sampling rate of 44.1 kHz per second is divided into a plurality of frames in which the sample length L per frame is 1000 samples, the audio file includes a total of 7,938,000 samples, and therefore may be divided into 7,938 frames. Each frame divided as described above has a playing time of approximately 0.023 seconds. The above exemplary sample length L per frame is only by way of example, and the invention is not limited thereto. When the sample length L per frame for dividing the input audio files into the plurality of frames becomes small, finer highlight sections can be selected, but the time to process each frame for selecting the highlight sections increases. Therefore, the exemplary sample length L per frame can be adjusted according to the performance of the system on which the apparatus for extracting the highlight section of music in accordance with the embodiment of the present invention is implemented.

Figure 2:
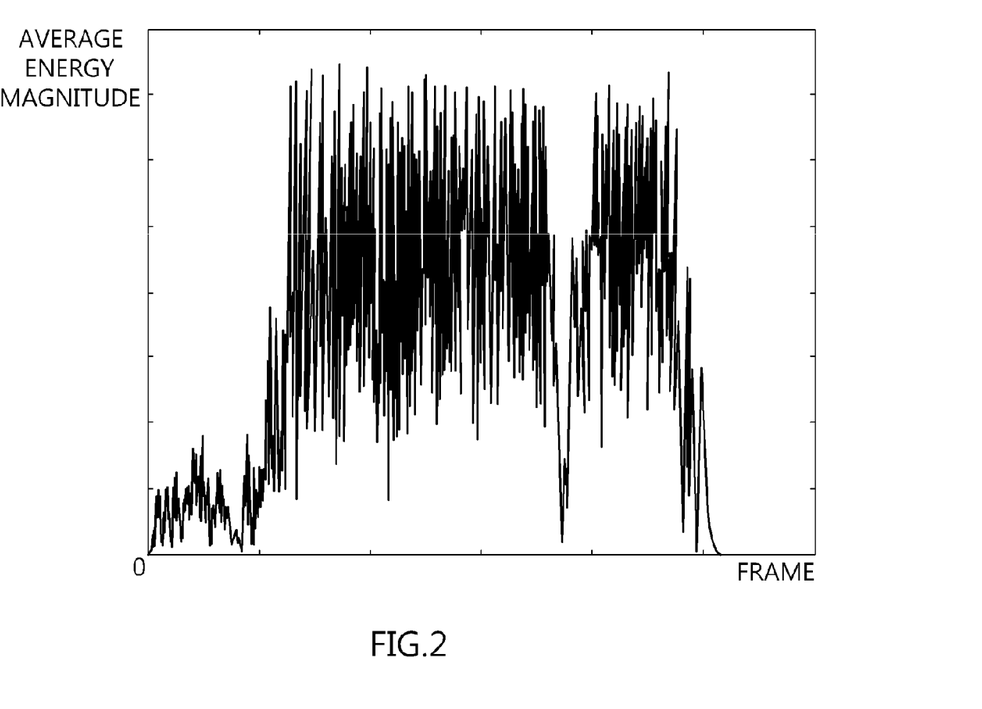
FIG. 2 is a diagram exemplarily illustrating signals representing the average magnitude of audio energy for each frame.

The average energy signal calculator 140 calculates the average value of the magnitude in audio energy of the plurality of samples belonging to each of the plurality of frames divided by the frame divider 120, thereby calculating signals having the average magnitude of audio energy for each frame. In this case, each of the plurality of frames divided by the frame divider 120 includes L samples. Here, the average magnitude of audio energy of each frame may be calculated by obtaining the absolute value of each of the L samples of each frame and taking the average value for the L samples to calculate the average magnitude of audio energy of each frame. The signals representing the average magnitude of audio energy for each frame may be exemplarily represented as illustrated in FIG. 2.

The highlight section selector 160 separates the low frequency signals from the signals representing the average magnitude of audio energy for each frame calculated by the average energy signal calculator 140 and determines the highlight sections based on the selection of the frame sections including the maximum points from the separated low frequency signals.

The start point searcher 180 searches for the start points of the highlight sections in the audio files using the position of the first frame of the highlight sections determined by the highlight section selector 160 and the sample length L of each frame, thereby playing the highlight sections.

Figure 3:
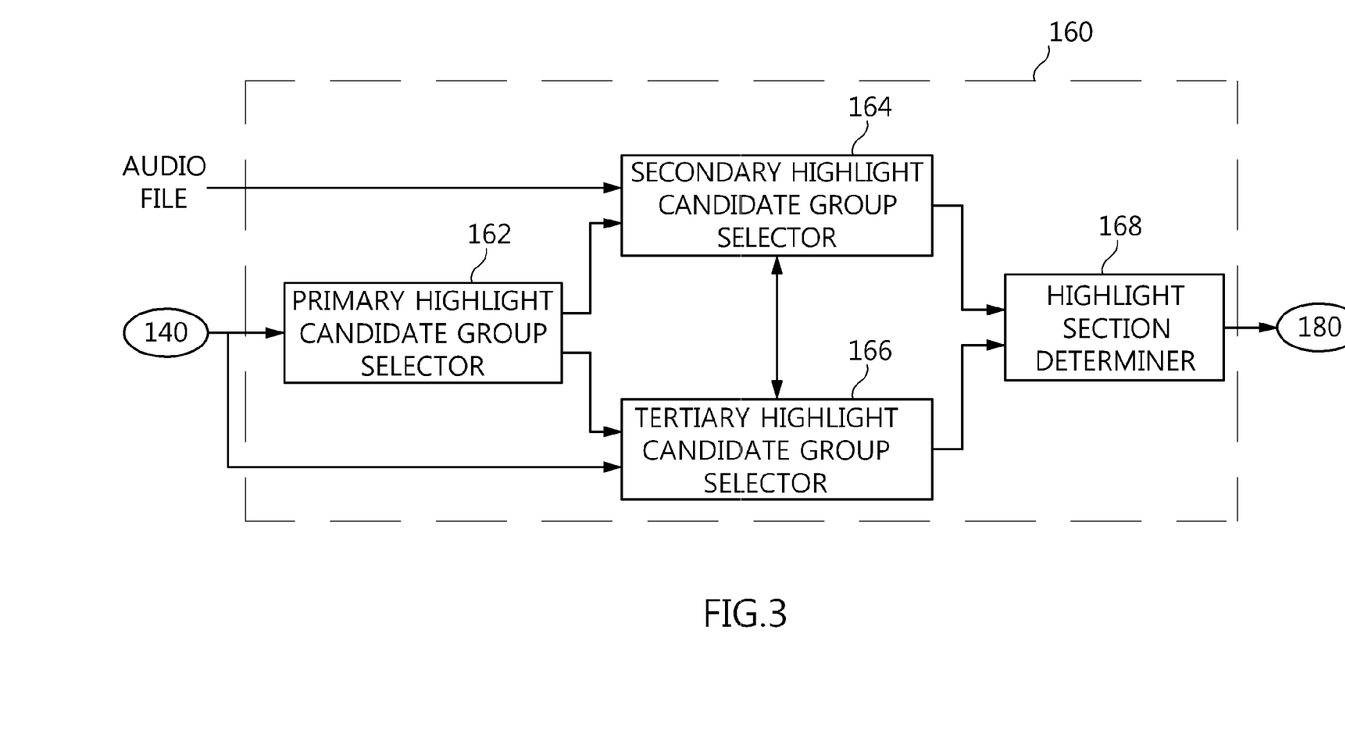
FIG. 3 is a block diagram schematically illustrating the configuration of a highlight section selector in the apparatus for extracting the highlight section of music in accordance with the embodiment of the present invention.

FIG. 3 is a block diagram schematically illustrating the configuration of a highlight section selector 160 in the apparatus for extracting the highlight section of music in accordance with the embodiment of the present invention.

Referring to FIG. 3, the highlight section selector 160 includes a primary highlight candidate group selector 162, a secondary highlight candidate group selector 164, a tertiary highlight candidate group selector 166, and a highlight section determiner 168.

Figure 4:
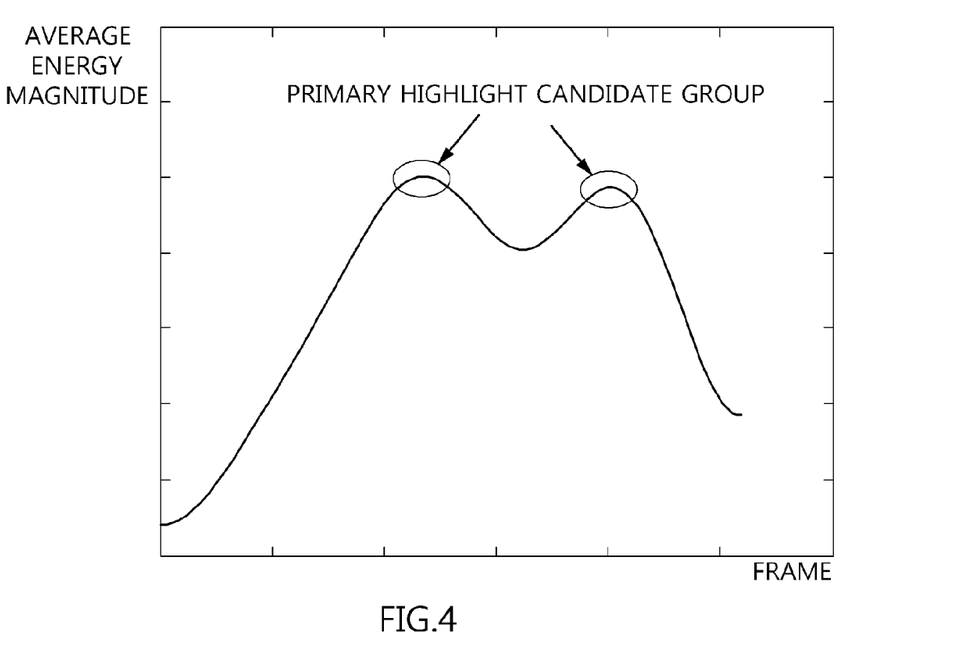
FIG. 4 is a diagram exemplarily illustrating low frequency signals separated from the signals representing the average magnitude of audio energy for each frame.

The primary highlight candidate group selector 162 separates the low frequency signals from the signals representing the average magnitude of audio energy for each frame calculated using the average energy signal calculator 140 and selects primary highlight section candidate groups from the separated low frequency signals. An example of the signals representing the average magnitude of audio energy for each frame calculated using the average energy signal calculator 140 is depicted in FIG. 2, but the amount of information for directly selecting the highlight sections from the signals is still too great. Therefore, in order to obtain predetermined frequency signals that may be used to select the highlight sections in the signals representing the average magnitude of audio energy for each frame, the low frequency signals including a large amount of information are separated from the overall signal. The example of low frequency signals separated from the signals representing the average magnitude of audio energy for each frame depicted in FIG. 2 may be represented as illustrated in FIG. 4. In FIG. 4, the sections including the frames having the maximum points at which the low frequency signals noticeably appear are selected as the primary highlight section candidate groups. Here, the frame sections selected as the primary highlight section candidate groups may each comprise one frame, but may preferably comprise a plurality of frames when considering the total playing time of the highlight provided by the system to which the apparatus for extracting the highlight section of music in accordance with the embodiment of the present invention is applied. In this case, when the frame sections selected as the primary highlight section candidate groups are each configured of the plurality of frames, the plurality of frame groups based on the frames having the maximum points of the low frequency signals may be selected as the frame sections selected as the primary highlight section candidate groups.

The secondary highlight candidate group selector 164 selects secondary highlight section candidate groups from the primary highlight section candidate groups selected by the primary highlight candidate group selector 162 by determining whether the audio files input to the frame divider 120 are audio files containing instrumentals.

In the case of music such as a pop song, in which voice and the sound of musical instruments coexist, the highlight sections representing the corresponding music are typically portions in which the voice is included. However, in the case of an instrumental or special music (music in which voice of a special type such as an instrumental including humming and the sound of musical instruments coexist), a portion including the playing of a musical instrument may be the highlight section representing the corresponding music. Therefore, the embodiment of the present invention first performs a process of determining whether the music of the input audio files is music such as a general pop song, in which a voice and musical instruments coexist, or an instrumental (including music configured only of humming and the sound of musical instruments), which consists mainly of the sound of musical instruments. In this case, the determination of the music of the input audio files as described above is performed according to the extraction of musical genre information included in the tags of the audio files or the reception of music genre information from an external database. As the determination result, when the music of the input audio files corresponds to general music, such as a general pop song in which a voice and musical instruments coexist, the corresponding frame sections are selected as the secondary highlight section candidate groups in the case of voice signals, and are not selected as the secondary highlight section candidate groups in the case of musical instrument sound signals, by differentiating whether the signals of the frame sections belonging to the primary highlight section candidate groups selected by separating the low frequency signals are the voice signals or the musical instrument sound signals. In this case, when all the signals of the frame sections belonging to the primary highlight section candidate groups are the musical instrument sound signals, the secondary highlight candidate groups may not be present. On the other hand, in the case of an instrumental (including music comprising only humming and the sound of musical instruments), the voice signals are not included in all the frame sections belonging to the primary highlight section candidate groups, and therefore all the primary highlight section candidate groups are selected as the secondary candidate groups.

That is, the secondary highlight candidate group selector 164 first determines whether the input audio files correspond to audio files containing instrumentals (including music comprising only humming and the sound of musical instruments) or correspond to audio files containing music of a type in which a voice is included, and as a result, when the input audio files correspond to audio files containing instrumentals, selects all the frame sections belonging to the primary highlight section candidate groups selected by the primary highlight candidate group selector 162 as the secondary highlight section candidate groups, and when the input audio files do not correspond to audio files containing instrumentals, selects the frame sections including the voice signals among the primary highlight section candidate groups as the secondary highlight section candidate groups.

The tertiary highlight candidate group selector 166 analyzes the average magnitude of audio energy for each frame of the adjacent frame sections of the start point of the first frame of the frame sections selected as the primary highlight candidate groups selected by the primary highlight candidate group selector 162, and selects as tertiary highlight section candidate groups the frame sections in which the average magnitude of audio energy changes the most in the frame section of the start point of the first frame of the frame sections belonging to the primary highlight section candidate groups.

Since the highlight section of music must be long enough to be recognized by listeners, the tertiary highlight candidate groups are selected by analyzing the average magnitude of audio energy for each frame in a section n seconds long before and after the start point of the first frame of the frame sections selected as the primary highlight candidate groups. For example, if it is assumed that the start point of the first frame of the frame sections selected as the primary highlight candidate groups is 5 seconds and n=2, the tertiary highlight candidate groups are selected by analyzing the average magnitude of audio energy for each frame in a section of 3 seconds to 7 seconds that are ±2 seconds from 5 seconds. The frame sections selected as the tertiary highlight candidate groups are a point at which the average magnitude of audio energy changes the most. When it is assumed that n seconds comprise k frames, 2n seconds, for which the average magnitude of audio energy is analyzed, may be represented as 1, 2, 3, ..., 2k−2, 2k−1, and 2k frames. In this case, the point at which the absolute value of the average audio energy difference in two consecutive n second sections based on n second sections of 1~k, 2~k+1, ..., k~2k−1, and k+1~2k is the largest is determined to be the tertiary highlight candidate groups. The selection of n seconds for analyzing adjacent sections of the frame sections selected as the primary highlight candidate groups is determined (0<n<N) based on the total playing time (N seconds) of the highlight provided by the system to which the apparatus for extracting the highlight section of music in accordance with the embodiment of the present invention is applied. In particular, n seconds may be preferably set to half (N/2 seconds) of the total playing time of the highlight. In this case, when the listeners listen to the highlight sections, highlight sections having a more flexible feeling may be selected as the n value is increased. However, the analysis time for the average magnitude of audio energy for each frame of the adjacent sections in which the tertiary highlight candidate groups are selected becomes long.

In the frame sections adjacent to the start point of the first frame of the frame sections belonging to the primary highlight section candidate groups, the frame sections belonging to the tertiary highlight candidate groups selected from the frame sections in which the average magnitude of audio energy changes the most coincide with the frame section belonging to the primary highlight section candidate groups, or may be located at a predetermined frame interval from the frame sections belonging to the primary highlight section candidate groups. Here, it is to be noted that the frame interval therebetween may vary depending on the change in the average magnitude of audio energy when the frame sections belonging to the tertiary highlight candidate groups are positioned at the predetermined frame interval from the frame sections belonging to the primary highlight section candidate groups.

The highlight section determiner 168 compares the secondary highlight section candidate groups selected by the secondary highlight candidate group selector 164 with the tertiary highlight section candidate groups selected by the tertiary highlight candidate group selector 166 to determine that the tertiary highlight section candidates corresponding to the secondary highlight section candidate groups are the final highlight sections when the tertiary highlight section candidates corresponding to the secondary highlight section candidate groups are present and to determine that the first frame section among the tertiary highlight section candidate groups is the final highlight section when the tertiary highlight section candidates corresponding to the secondary highlight section candidate groups are not present.

As described above, the frame sections belonging to the tertiary highlight section candidate groups coincide with the frame sections belonging to the primary highlight section candidate groups, or may be located at a specific frame interval from the frame sections belonging to the primary highlight section candidate groups. In this case, the highlight section determiner 168 aligns the frame sections belonging to the tertiary highlight section candidate groups in an order such that the inter-frame distance from the frame sections belonging to the primary highlight section candidate groups is short. Further, if it is determined that frame sections belonging to the tertiary highlight sections corresponding to the frame sections belonging to the secondary highlight section candidate groups are present by determining whether frame sections belonging to the tertiary highlight section candidate groups corresponding to the frame sections belonging to the secondary highlight section candidate groups are present, the frame sections belonging to the tertiary highlight section candidate groups in which the inter-frame distance from the frame sections belonging to the primary highlight sections, among the frame sections belonging to the tertiary highlight section candidate groups corresponding to the frame sections belonging to the secondary highlight section candidate groups, is shortest is determined to be the final highlight section. In this case, the determination on whether the frame sections belonging to the tertiary highlight section candidate groups correspond to the frame sections belonging to the secondary highlight section candidate groups may be made according to whether the tertiary highlight candidates are present between n second sections after and before the secondary highlight candidates. That is, when the first corresponding frame section appears by comparing the frame sections belonging to the tertiary highlight section candidate groups with the frame sections belonging to the secondary highlight section candidate groups in an order such that the frame interval from the frame section belonging to the primary highlight section candidate groups is short, the first corresponding frame section is determined to be the final highlight section.

As described above, when the final highlight section is determined by the highlight section determiner 168, the start point searcher 180 may determine the time at which the highlight section starts from music corresponding to the input audio file by using the position of the first frame of the final highlight section and the sample length L per frame. For example, when the music having a sampling rate of 44.1 kHz is present, the position of the first frame of the frame sections determined as the final highlight section is frame No. 2454, and the sample length L per frame is 1000, the portion of the corresponding music that is played may be the highlight sections from the 55.6th (≈454×1000/44.1k) second.

Hereinafter, a method for extracting a highlight section of music in accordance with the embodiment of the present invention will be described.

Figure 5:
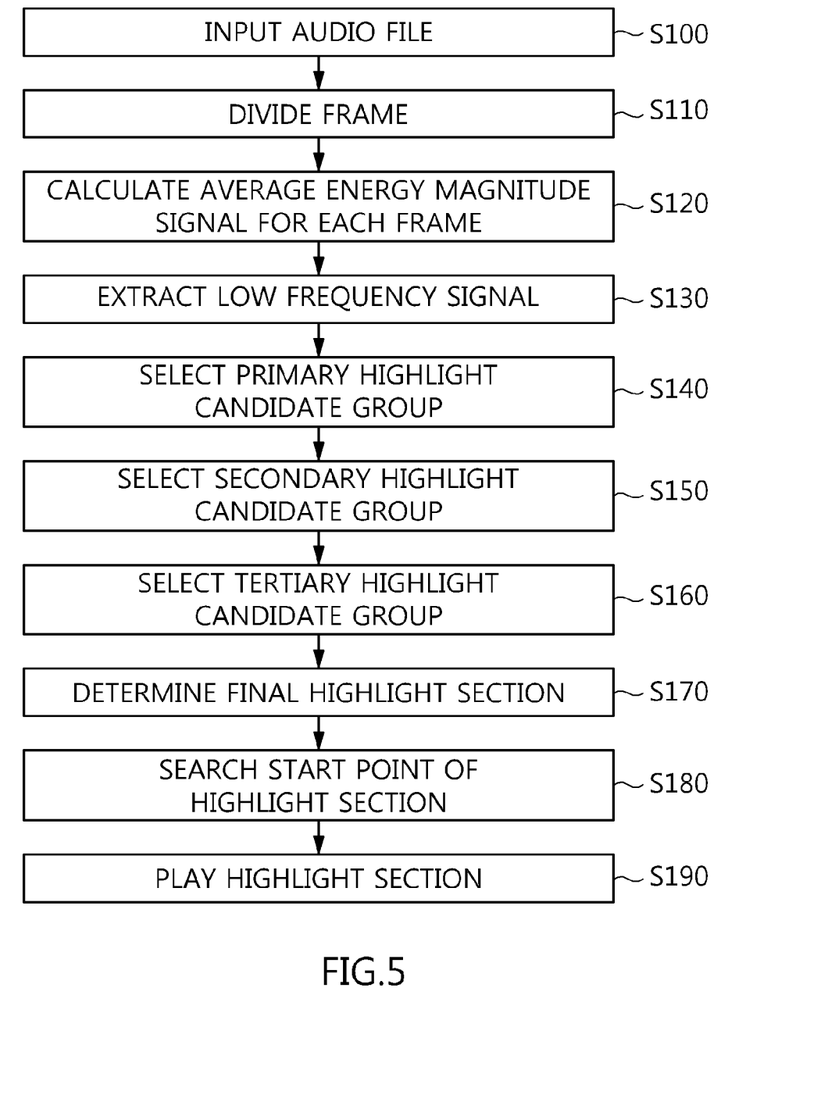
FIGS. 5 to 8 are flow charts for describing the method for extracting the highlight section of music in accordance with the embodiment of the present invention.

FIG. 5 is a flow chart for describing a method for extracting a highlight section of music in accordance with the embodiment of the present invention.

Referring to FIG. 5, the method for extracting the highlight section of music in accordance with the embodiment of the present invention first allows the frame divider 120 to receive the audio files (S100) and divide the input audio files into a plurality of frames having a predetermined sample length (L) (S110).

Next, the average energy signal calculator 140 calculates the average value of the magnitude of audio energy for the plurality of samples belonging to each frame for each frame for the plurality of frames divided by the frame divider 120, thereby calculating the signal having the average magnitude of audio energy for each frame (S120).

Further, the primary highlight candidate group selector 162 extracts the low frequency signals from the signals of the average magnitude of audio energy for each frame calculated using the average energy signal calculator 140 (S130), and selects the frame sections that include the frames having the maximum points of the extracted low frequency signals as the primary highlight section candidate groups (S140).

Next, the secondary highlight candidate group selector 164 selects the secondary highlight section candidate groups from the primary highlight section candidate groups selected by the primary highlight candidate group selector 162 (S150) by determining whether the audio files input to the frame divider 120 are audio files containing instrumentals.

Further, the tertiary highlight candidate group selector 166 selects the tertiary highlight section candidate groups by analyzing the average magnitude of audio energy for each frame for the adjacent frame sections of the start point of the first frame of the frame section belonging to the primary highlight section candidate groups selected by the primary highlight candidate group selector 162 (S160).

Next, the highlight section determiner 168 compares the frame sections belonging to the secondary highlight candidate groups selected by the secondary highlight candidate group selector 164 with the frame sections belonging to the tertiary highlight candidate groups selected by the tertiary highlight candidate group selector 166 to determine the final highlight section (S170).

Further, the start point searcher 180 searches the start points of the highlight sections in the audio files input to the frame divider 120 using the position of the first frame of the final highlight section determined by the highlight section determiner 168 and the sample length L per frame (S180), and plays the highlight section by determining the time at which the highlight sections starts from the music corresponding to the audio files at S180 (S190).

Figure 6:
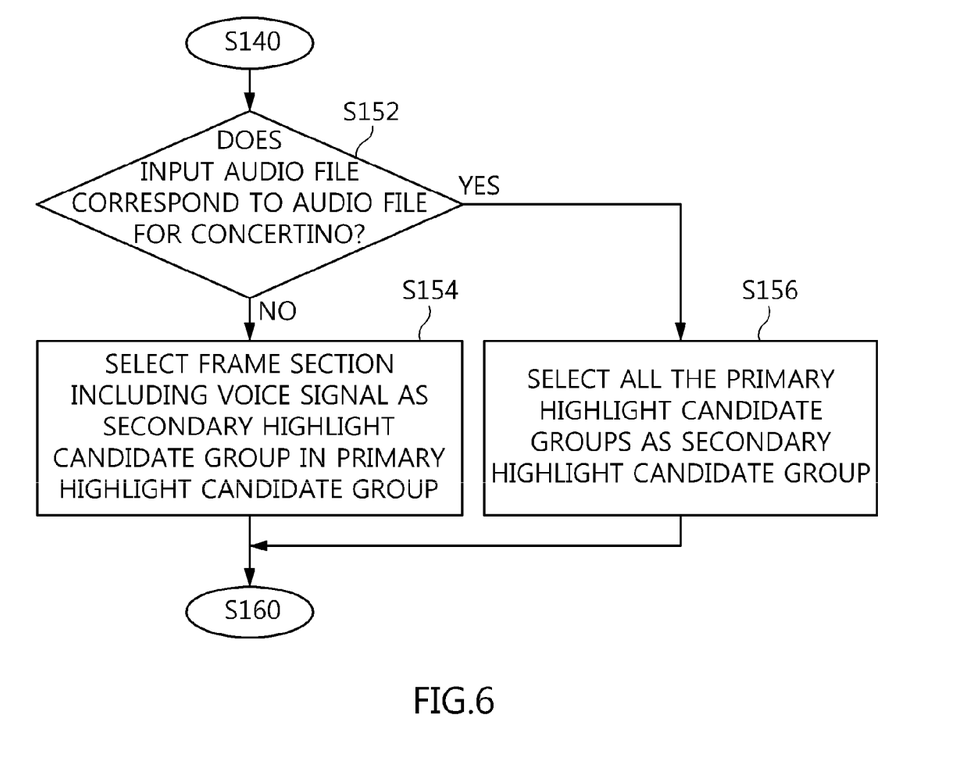

FIG. 6 is a flow chart for describing S150 in the method for extracting the highlight section of music in accordance with the embodiment of the present invention.

Referring to FIG. 6, the secondary highlight candidate group selector 164 first determines whether the audio files input to the frame divider 120 correspond to audio files containing instrumentals (including music comprising only humming and the sound of musical instruments) (S152).

As the result of the determination at S152, when the audio files input to the frame divider 120 correspond to audio files containing music of the type of a general pop song, in which a voice and musical instruments coexist, rather than an instrumental (including music comprising only humming and the sound of musical instruments), the frame sections including the voice signal among the primary highlight section candidate groups selected by the primary highlight candidate group selector 162 are selected as the secondary highlight section candidate groups (S154).

On the other hand, as the result of the determination at S152, when the audio files input to the frame divider 120 correspond to the audio files containing instrumentals (including music comprising only humming and the sound of musical instruments), all the frame sections belonging to the primary highlight section candidate groups selected by the primary highlight candidate group selector 162 are selected as the secondary highlight section candidate groups (S154).

Figure 7:
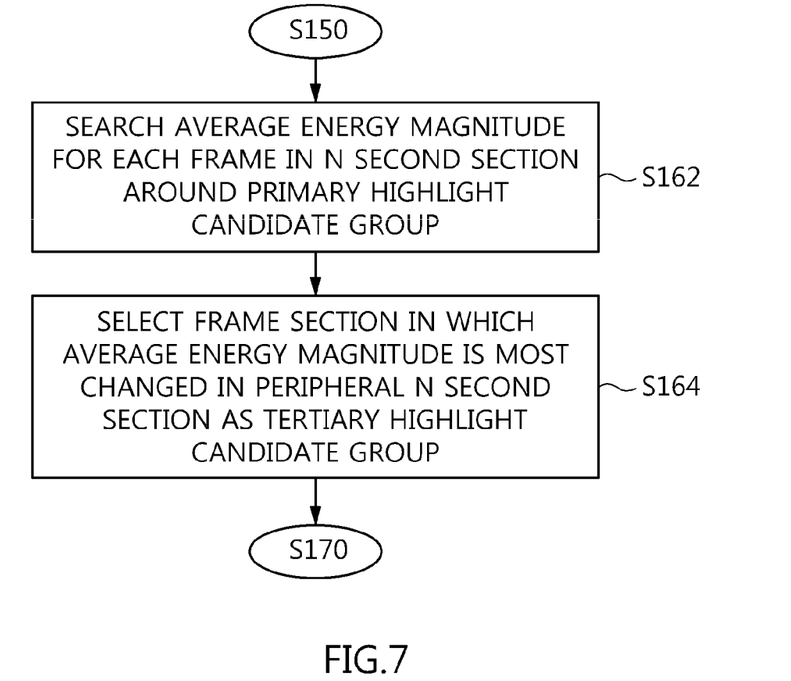

FIG. 7 is a flow chart for describing S160 in the method for extracting the highlight section of music in accordance with the embodiment of the present invention.

Referring to FIG. 7, the tertiary highlight candidate group selector 166 first searches for the average magnitude of audio energy for each frame in adjacent n second sections of the start point of the first frame of the frame sections belonging to the primary highlight section candidate groups selected by the primary highlight candidate group selector (S162).

Next, the tertiary highlight candidate group selector 166 selects the frame sections belonging to the primary highlight section candidate groups and the frame sections in which the average magnitude of audio energy changes the most in the adjacent n second sections as the tertiary highlight section candidate group (S164).

Figure 8:
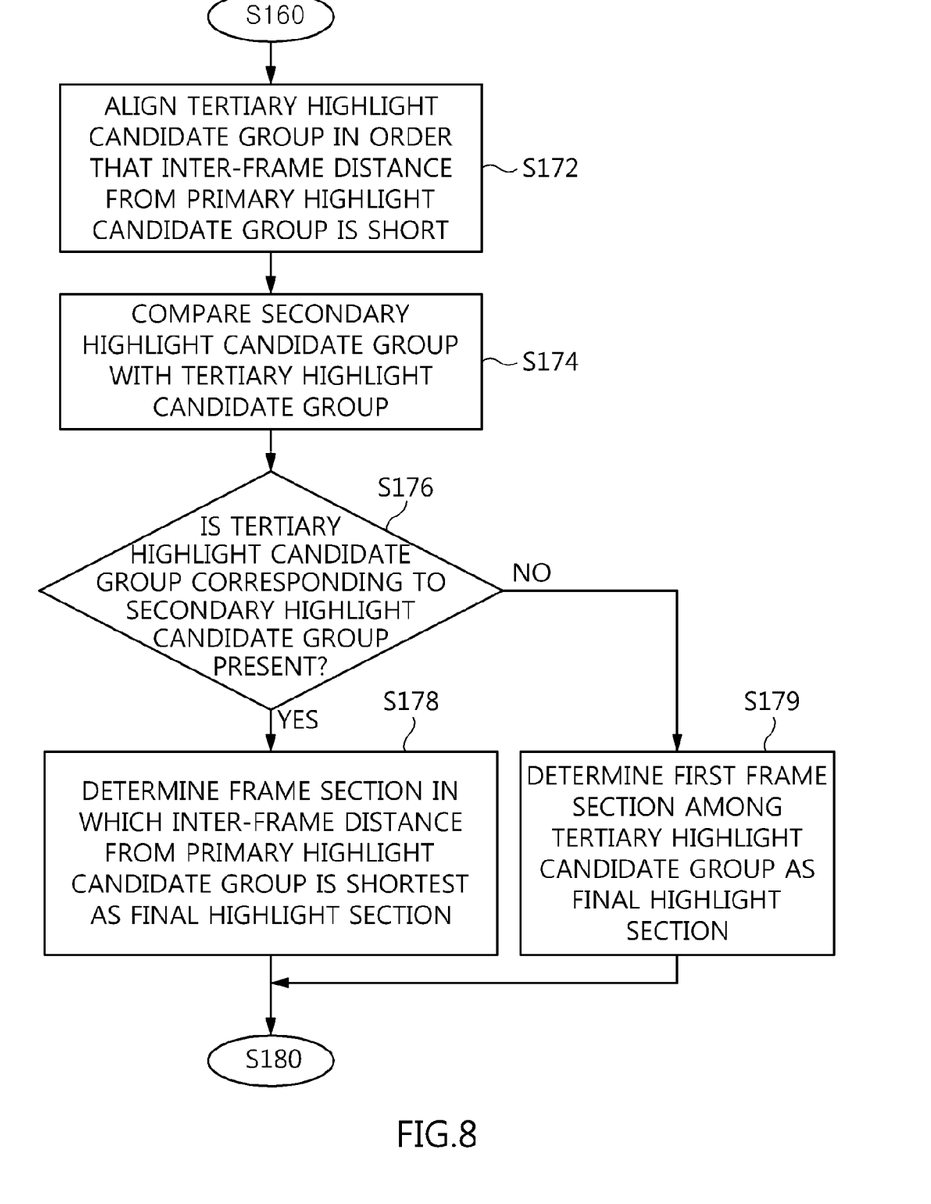

FIG. 8 is a flow chart for describing S170 in the method for extracting the highlight section of music in accordance with the embodiment of the present invention.

Referring to FIG. 8, the highlight section determiner 168 first aligns the frame sections belonging to the tertiary highlight candidate groups in an order such that the inter-frame distance from the frame sections belonging to the primary highlight candidate groups is short (S172).

Next, the highlight section determiner 168 compares the frame sections belonging to the secondary highlight candidate groups with the frame section belonging to the tertiary highlight candidate groups (S174) to determine whether frame sections corresponding to the frame sections belonging to the secondary highlight candidate groups among the frame sections belonging to the tertiary highlight candidate groups are present (S176).

As the result of the determination at S176, when frame sections belonging to the tertiary highlight candidate groups corresponding to the frame section belonging to the secondary highlight candidate groups are present, the frame sections belonging to the tertiary highlight candidate groups in which the inter-frame distance from the frame sections belonging to the primary highlight candidate group is shortest are determined to be the final highlight section (S178).

On the other hand, as the result of the determination as S176, when no secondary highlight candidate groups are present, the first frame section among the frame sections belonging to the tertiary highlight candidate groups is determined to be the final highlight section (S179).

In accordance with the exemplary embodiments of the present invention, when the listeners wish to search for music that has been listened to, or that suits their tastes, in a vast music database that is held by or can be accessed by the music listeners, the listeners can easily check the corresponding music because the representative highlight section of music is provided.

Further, the exemplary embodiments of the present invention can provide technology for extracting the highlight section of music that can be used for services of playing the highlight sections in real time by searching the highlight section of music through the simple analysis of the audio files, or can be used by devices having relatively low processing capability, such as mobile terminals.

While the present invention has been described with respect to the specific embodiments, it will be apparent to those skilled in the art that various changes and modifications may be made without departing from the spirit and scope of the invention as defined in the following claims.

What is claimed is:

1. An apparatus for extracting a highlight section of music so as to play the highlight section by analyzing an input music file, comprising:
   a frame divider that divides the input music file into a plurality of frames having a predetermined sample length;
   an average energy signal calculator that calculates a signal representing an average audio energy magnitude for a plurality of samples belonging to each frame for each frame of the plurality of frames;
   a highlight section selector that extracts a low frequency signal from the signal representing the average audio energy magnitude for each frame and determines the highlight section from frame sections including maximum points of the low frequency signal; and
   a start point searcher that searches for a start point of the highlight section from the input music file by using a position of a first frame of the highlight section determined by the highlight section selector and sample lengths of each frame,
   wherein the highlight section selector includes a primary highlight candidate group selector that selects the frame sections that include maximum points of low frequency signals as primary highlight section candidate groups,
   wherein the highlight section selector further includes a secondary highlight candidate group selector that selects secondary highlight section candidate groups from the primary highlight section candidate groups by determining whether the input music file is an instrumental music file, and
   wherein the secondary highlight candidate group selector selects all frame sections belonging to the primary highlight section candidate groups as the secondary highlight section candidate groups if it is determined that the input music file is the instrumental music file, and selects frame sections including voice signals among the frame sections belonging to the primary highlight section candidate groups as the secondary highlight section candidate groups if it is determined that the input music file is not the instrumental music file.

2. The apparatus of claim 1, wherein the highlight section selector further includes a tertiary highlight candidate group selector that analyzes the average audio energy magnitude for each frame for adjacent frame sections of a start point of a first frame of the frame sections belonging to the primary highlight section candidate groups, and selects as tertiary highlight section candidate groups frame sections in which the average audio energy magnitude is most changed in the adjacent frame sections of the start point of the first frame of the frame sections belonging to the primary highlight section candidate groups.

3. The apparatus of claim 2, wherein the highlight section selector further includes a highlight section determiner that determines that a first frame section of frame sections belonging to the tertiary highlight section candidate groups is a final highlight section if it is determined that the frame sections of the tertiary highlight section candidate groups corresponding to frame sections of the secondary highlight section candidate groups are not present when comparing the secondary highlight section candidate groups with the tertiary highlight section candidate groups.

4. The apparatus of claim 2, wherein the highlight section selector further includes a highlight section determiner that determines that a frame section belonging to the frame sections of the tertiary highlight section candidate groups corresponding to the frame sections of the secondary highlight section candidate groups is the final highlight section if it is determined that the frame sections of the tertiary highlight section candidate groups corresponding to the frame sections of the secondary highlight section candidate groups are present by comparing the secondary highlight section candidate groups with the tertiary highlight section candidate groups.

5. A method for extracting a highlight section of music so as to play the highlight section by analyzing an input music file, comprising:
   dividing the input music file into a plurality of frames having a predetermined sample length using a frame divider;
   calculating a signal representing an average audio energy magnitude for a plurality of samples belonging to each frame for each frame of the plurality of frames, using an average energy signal calculator;
   extracting a low frequency signal from the signal representing the average audio energy magnitude for each frame and determining the highlight section from frame sections including maximum points of the low frequency signal, using a highlight determiner; and
   searching a start point of the highlight section from the input music file by using a position of a first frame of the highlight section and sample lengths of each frame,
   wherein the determining the highlight section from the frame sections including maximum points of the low frequency signals includes selecting the frame sections including the maximum points of the low frequency signals as primary highlight section candidate groups, wherein the determining the highlight section from the frame sections including maximum points of the low frequency signals further includes selecting secondary highlight section candidate groups from the primary highlight candidate group selector by determining whether the input music file is an instrumental music file, and wherein at the selecting the secondary highlight section candidate groups, all frame sections belonging to the primary highlight section candidate groups are selected as the secondary highlight section candidate groups if it is determined that the input music file is the instrumental music file, and frame sections including voice signals among the frame sections belonging to the primary highlight section candidate groups are selected as the secondary highlight section candidate groups if it is determined that the input music file is not the instrumental music file.

6. The method of claim 5, wherein the determining the highlight section from the frame sections including maximum points of the low frequency signals further includes:

analyzing the average audio energy magnitude for each frame for adjacent frame sections of a start point of a first frame of the frame sections belonging to the primary highlight section candidate groups, and selecting as tertiary highlight section candidate groups the frame sections in which the average audio energy magnitude is most changed in the adjacent frame sections of the start point of the first frame of the frame sections belonging to the primary highlight section candidate groups.

7. The method of claim 6, wherein the determining the highlight section from the frame sections including maximum points of the low frequency signals further includes:

comparing the secondary highlight section candidate groups with the tertiary highlight section candidate groups; and determining a first frame section among frame sections belonging to the tertiary highlight section candidate groups to be a final highlight section if it is determined that the frame sections of the tertiary highlight section candidate groups corresponding to frame sections of the secondary highlight section candidate groups are not present.

8. The method of claim 6, wherein the determining the highlight section from the frame sections including maximum points of the low frequency signals further includes:

comparing the secondary highlight section candidate groups with the tertiary highlight section candidate group; and determining that a frame section belonging to the frame sections of the tertiary highlight section candidate groups corresponding to the frame sections of the secondary highlight section candidate groups is a final highlight section when the frame sections of the tertiary highlight section candidate groups corresponding to the frame sections of the secondary highlight section candidate groups are present.

* * * * *